United States Patent [19]

Candor

[11] Patent Number: 5,019,230

[45] Date of Patent: * May 28, 1991

[54] APPARATUS AND METHOD FOR REMOVING LIQUID FROM LIQUID BEARING MATERIAL

[76] Inventor: James T. Candor, 5440 Cynthia La., Dayton, Ohio 45429

[*] Notice: The portion of the term of this patent subsequent to Dec. 4, 2007 has been disclaimed.

[21] Appl. No.: 502,506

[22] Filed: Mar. 30, 1990

Related U.S. Application Data

[63] Continuation-in-part of Ser. No. 454,718, Dec. 21, 1989, Pat. No. 4,975,166, which is a continuation-in-part of Ser. No. 386,579, Jul. 27, 1989, abandoned, which is a continuation-in-part of Ser. No. 284,197, Dec. 14, 1988, Pat. No. 4,877,503, which is a continuation-in-part of Ser. No. 213,709, Jun. 30, 1988, abandoned, which is a continuation-in-part of Ser. No. 189,974, May 4, 1988, abandoned, which is a continuation-in-part of Ser. No. 62,201, Jun. 15, 1987, Pat. No. 4,780,188, which is a continuation-in-part of Ser. No. 32,746, Mar. 31, 1987, Pat. No. 4,767,514.

[51] Int. Cl.$^5$ .............................................. B01D 57/02
[52] U.S. Cl. .............................. 204/182.1; 204/180.1; 204/182.2; 204/183.1; 204/182.3; 204/299 R; 204/300 R; 204/302; 204/304; 204/305; 204/307
[58] Field of Search ............... 204/180.1, 182.1, 182.2, 204/183.1, 186, 299 R, 300 R, 302, 304, 305, 307, 182.3

[56] References Cited

U.S. PATENT DOCUMENTS

| | | | |
|---|---|---|---|
| 2,740,756 | 4/1956 | Thomas | 204/180 |
| 3,705,847 | 12/1972 | Stiles | 204/181 |
| 3,931,682 | 1/1976 | Candor | 34/1 |
| 4,236,317 | 12/1980 | Candor | 34/1 |
| 4,341,617 | 7/1982 | King | 204/302 |
| 4,561,953 | 12/1985 | Muralidhara et al. | 204/182.3 |
| 4,747,920 | 5/1988 | Muralidhara et al. | 204/182.3 |
| 4,767,514 | 8/1988 | Candor | 204/299 R |
| 4,780,188 | 10/1988 | Candor | 204/182.1 |
| 4,802,964 | 2/1989 | Muralidhara et al. | 204/180.1 |
| 4,877,503 | 10/1989 | Candor | 204/182.1 |

OTHER PUBLICATIONS

"Electroosmotic Dewatering of Clays. I. Influence of Voltage", by N. C. Lockhart, colloids and Solids, vol. 6, pp. 229–238.
Chapter 14, pp. 335–374, of the book *Advances In Solid-Liquid Separation*, (11/12/86).
"Effect of a Corona Discharge Field On Evaporation of Liquids From Capillaries", by Karpovich et al., J. Eng. Phys., 1981, 41, 1333.
"Study of Electric Fields–Induced Effects on Water Vapor Adsorption in Porous Adsorbents", by Someshwar et al., Ind. Eng. Chem. Fundam., 1985, 24, 215–220.
"Effect of an Electric Field on the Kinetics of Water Sorption by a Capillary–Porous Material", by Panchenko et al., J. Eng. Phys., 1972, 22, 554.
"Influence of Inhomogeneous Electric and Magnetic Fields on Internal Mass Transfer In Capillary–Porous Bodies", by Panasyuk et al., J. Eng. Phys., 1978, 35, 827.

*Primary Examiner*—John F. Niebling
*Assistant Examiner*—David G. Ryser
*Attorney, Agent, or Firm*—Candor, Candor & Tassone

[57] ABSTRACT

An apparatus and method for removing liquid from liquid bearing material are provided, the apparatus comprising a pair of electrodes having portions thereof disposed adjacent each other and defining an inlet to the adjacent portions and an outlet from the adjacent portions, structure for feeding the liquid bearing material into the inlet, structure for moving the liquid bearing material from the inlet to the outlet so that sections of the material serially move from the inlet to the outlet while being disposed between the adjacent portions, and a unit for creating a voltage between the pair of electrodes so as to create an electrostatic field arrangement between the adjacent portions of the pair of electrodes for acting through the material that is disposed therebetween to remove liquid from that material, the unit providing different voltages between different parts of the pair of electrodes so that different intensities of the electrostatic field arrangement serially act through each section of the material as each section of material moves from the inlet to the outlet.

19 Claims, 1 Drawing Sheet

APPARATUS AND METHOD FOR REMOVING LIQUID FROM LIQUID BEARING MATERIAL

CROSS-REFERENCE TO RELATED APPLICATIONS

This application is a Continuation-in-Part patent application of its copending parent patent application, Ser. No. 454,718 filed Dec. 21, 1989 which, in turn is a Continuation-in-Part patent application of its copending parent patent application, Ser. No. 386,579, filed July 27, 1989, now abandoned, which, in turn, is a Continuation-in-Part patent application of its copending parent patent application, Ser. No. 284,197, filed Dec. 14, 1988, now patent No. 4,877,503, which, in turn, is a Continuation-in-Part patent application of its copending parent patent application, Ser. No. 213,709, filed June 30, 1988, now abandoned, which, in turn, is a Continuation-in-Part patent application of its copending parent patent application, Ser. No. 189,974, filed May 4, 1988, now abandoned, which, in turn, is a Continuation-in-Part patent application of its copending parent patent application, Ser. No. 062,201, filed June 15, 1987, now patent No. 4,780,188, which in turn, is a Continuation-in-Part patent application of its copending parent patent application, Ser. No. 032,746, filed Mar. 31, 1987, now patent No. 4,767,514.

BACKGROUND OF THE INVENTION

1. Field of the Invention

This invention relates to a new apparatus for removing liquid from liquid bearing material and to a new method for removing liquid from liquid bearing material.

2. Prior Art Statement

It is known to provide an apparatus for removing liquid from liquid bearing material and comprising a pair of electrode means having portions thereof disposed adjacent each other and defining an inlet means to the adjacent portions and an outlet means from the adjacent portions, means for feeding the liquid bearing material into the inlet means, means for moving the liquid bearing material from the inlet means to the outlet means so that sections of the material serially move from the inlet means to the outlet means while being disposed between the adjacent portions, and means for creating a voltage between the pair of electrode means so as to create an electrostatic field arrangement between the adjacent portions of the pair of electrode means for acting through the material that is disposed therebetween to remove liquid from that material. For example, see Candor U.S. Pat. No. 3,931,682; Candor U.S. Pat. No. 4,236,317; Stiles U.S. Pat. No. 3,705,847; Thomas U.S. Pat. No. 2,740,756, and Muralidhara et al, U.S. Pat. No. 4,802,964.

It is also known to step the voltage acting through a liquid bearing material in a batch process where the liquid bearing material is stationary between a pair of electrode means. For example, see the article entitled "Electroosmotic Dewatering of Clays, I. Influence of Voltage" by N. C. Lockhart, published in 1983 in *Colloids and Surfaces*, Vol. 6, pages 229-238.

It is also known to provide an apparatus for removing liquid from liquid bearing material and comprising a pair of spaced electrodes for being disposed on opposite sides of the material, means for creating an electrostatic field between the electrodes for acting through the material to remove liquid from the material, and a projection extending from one of the electrodes to assist in removing liquid from the liquid bearing material, the electrodes comprising a pair of movable endless belts having adjacent runs thereof adapted to move in the same direction with the material therebetween so as to move in the same direction therewith. For example, see the aforementioned Candor U.S. Pat. No. 4,236,317.

It is also known to have the projection of an arrangement project through an opening means passing through one of the electrodes. For example, see King U.S. Pat. No. 4,341,617.

While the aforementioned Candor U.S. Pat. No. 4,236,317, also describes that the projection and the electrodes can be sonically or ultrasonically vibrated while the projection is projecting into and/or through the liquid bearing material that is disposed between the electrodes for further enhancing the electrostatic action in removing liquid from the liquid bearing material, also see the aforementioned Candor U.S. Pat. No. 3,931,682; the Muralidhara et al, U.S. Pat. No. 4,561,953; the Muralidhara et al, U.S. Pat. No. 4,747,920; the aforementioned Muralidhara et al, U.S. Pat. No. 4,802,964 and Chapter 14, pages 335-374, of the book *Advances In Solid-Liquid Separation* edited by H. S. Muralidhara for other examples of apparatus that utilize sonic or ultrasonic vibrations in combination with an electrostatic field to remove liquid from liquid bearing material.

It is also known that liquid in capillaries or porous material tends to physically move in the direction of increasing field inhomogeneity to the capillary or pore mouth when an inhomogeneous electrostatic or electric field or nonuniform electrostatic or electric field is directed across that capillary or porous body. For example, see the article "Effect of a Corona Discharge Field On Evaporation of Liquids From Capillaries" by Karpovich et al, J. Eng. Phys., 1981, 41, 1333. In addition, see the article "Study of Electric Field-Induced Effects On Water Vapor Adsorption In Porous Adsorbents" by Someshwar et al, Ind. Eng. Chem. Fundam., 1985, 24, 215-220; the article "Effect of an Electric Field on the Kinetics of Water Sorption by a Capillary-Porous Material" by Panchenko et al, J. Eng. Phys., 1972, 22, 554, and the article "Influence of Inhomogeneous Electric and Magnetic Fields On Internal Mass Transfer In Capillary-Porous Bodies" by Panasyuk et al, J. Eng. Phys., 1978, 35, 827.

SUMMARY OF THE INVENTION

One feature of this invention is to provide a new apparatus and method for removing liquid from liquid bearing material by increasing the voltage between adjacent portions of the electrodes in a unique manner to assist in removing liquid from the liquid bearing material.

In particular, it is believed according to the teachings of this invention that as the liquid in liquid bearing material is being removed by the action of an electrostatic field that passes through the material, the amount of liquid remaining in the material requires a higher voltage between the electrodes that create the electrostatic field therebetween to further remove the same because the capillary holding force on the remaining liquid is harder to overcome at a lesser voltage that is sufficient to remove the liquid when the material is initially being dewatered. For example, see the aforementioned article "Electroosmotic Dewatering of Clays, I. Influence of Voltage" by N. C. Lockhart,

*Colloids and Surfaces*, Vol. 6, pages 229–238, whereby this article is being incorporated into this disclosure by this reference thereto.

Therefore, it is further believed according to the teachings of this invention that unique means can be provided to permit such varying voltage to be utilized with an apparatus that has means for moving the liquid bearing material from an inlet means to an outlet means of the apparatus that are respectively defined by adjacent portions of the pair of electrode means of the apparatus.

For example, one embodiment of this invention provides an apparatus for removing liquid from liquid bearing material and comprising a pair of electrode means having portions thereof disposed adjacent each other and defining an inlet means to the adjacent portions and an outlet means from the adjacent portions, means for feeding the liquid bearing material into the inlet means, means for moving the liquid bearing material from the inlet means to the outlet means so that sections of the material serially move from the inlet means to the outlet means while being disposed between the adjacent portions, and means for creating a voltage between the pair of electrode means so as to create an electrostatic field arrangement between the adjacent portions of the pair of electrode means for acting through the material that is disposed therebetween to remove liquid from that material, the apparatus having means for providing different voltages between parts of the pair of electrode means so that different intensities of the electrostatic field arrangement serially act through each section of the material as each section of material moves from the inlet means to the outlet means.

Accordingly, it is an object of this invention to provide a new apparatus for removing liquid from liquid bearing material and having one or more of the novel features of this invention as set forth above or hereinafter shown or described.

Another object of this invention is to provide a new method for removing liquid from liquid bearing material, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
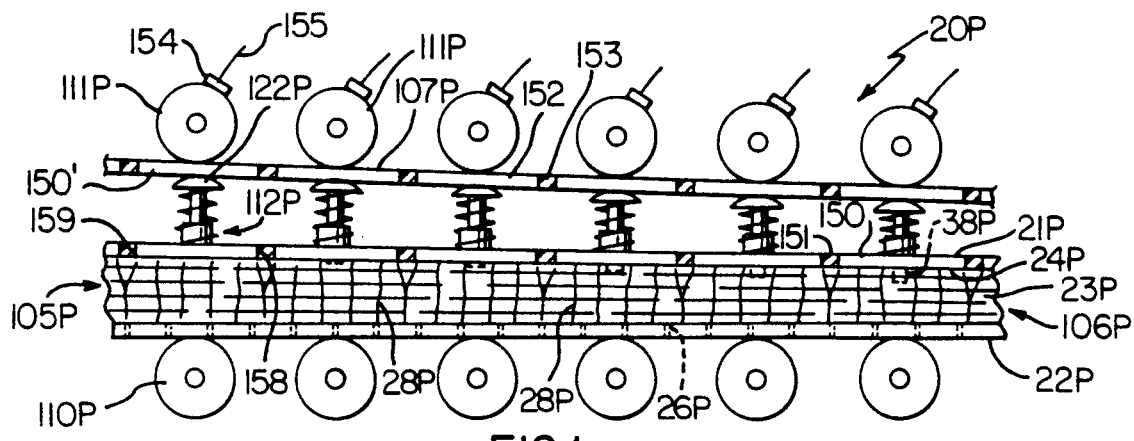
FIG. 1 is a fragmentary cross-sectional view that schematically illustrates the apparatus and method of this invention for removing liquid from liquid bearing material.

While the various features of this invention are hereinafter described and illustrated as being particularly adapted to provide an apparatus and method for dewatering certain types of liquid bearing material, it is to be understood that the various features of this invention can be utilized singly or in various combinations thereof to remove liquid from other types of liquid bearing material or to merely reduce the liquid content of a liquid bearing material with the resulting dewatered product still being considered as being relatively liquid.

Therefore, this invention is not to be limited to only the embodiments illustrated in the drawings, because the drawings are merely utilized to illustrate some of the wide variety of uses of this invention.

Referring now to FIG. 1, the method and apparatus of this invention is generally indicated by the reference numeral 20P and comprises a pair of spaced apart electrode means 21P and 22P disposed on opposite sides of a liquid bearing material 23P, such as a slurry of a liquid and particles, fibers, etc., the electrode means 21P and 22P comprising any suitable electrically conductive material and respectively having facing sides 24P and 25P for being disposed in engagement with the material 23P in any of the manners set forth in the aforementioned eight U.S. patents and Chapter 14 of the book *Advances In Solid-Liquid Separation* whereby the Candor U.S. Pat. Nos. 4,236,317 and 3,931,682; the Muralidhara et al, U.S. Pat. Nos. 4,561,953, 4,747,920 and 4,802,964; the Thomas U.S. Pat. No. 2,740,756; the Stiles U.S. Pat. No. 3,705,847; the King U.S. Pat. No. 4,341,617 and Chapter 14 of the book *Advances In Solid-Liquid Separation* edited by H. S. Muralidhara are being incorporated into this disclosure by this reference thereto not only for the teachings of the apparatus, methods and theories of electro-dewatering thereof, but also for the teachings of some of the types of liquid bearing materials that can be utilized in the apparatus and methods 20P, 20Q, 20R and 20S of this invention.

Also, see the Diaz U.S. Pat. No. 4,861,496; the European patent application to Yamaguchi et al, No. 0,286,714 and pages 504–519 of the newly published book of Battelle Press and entitled *Solid/Liquid Separation: Waste Management and Productivity Enhancement* edited by H. S. Muralidhara whereby these three items are also being incorporated into this disclosure by this reference thereto.

Since a full disclosure of the general structure and the theories of operation of the apparatus 20P is provided in applicant's issued U.S. Pat. No. 4,877,503, which patent is also being incorporated into this disclosure by this reference thereto, only the details of the apparatus 20P necessary to understand the new features of this invention will now be described.

However, the apparatus of such U.S. Pat. No. 4,877,503 have the upper electrode means thereof respectively arranged so that the same voltage differential is provided with its cooperating lower electrode means from the respective inlet means to the respective outlet means thereof. In contrast, it is believed according to the teachings of this invention that the upper electrode belts thereof each could be so constructed and arranged that the same would permit parts thereof to provide an increasing voltage differential with its adjacent portion of the lower electrode belt means as that part of the upper electrode belt moves from the inlet means to the outlet means so that the resulting intensity of the electrostatic field being created by the particular voltage gradient will be increased to provide a greater dewatering action as that part of the upper electrode means moves toward the outlet means of the apparatus than at the inlet means thereof.

In particular, such an apparatus and method of this invention is generally indicated by the reference numeral 20P in FIG. 1 and parts thereof similar to the apparatus and methods set forth in such U.S. Pat. No. 4,877,503 are indicated by like reference numerals followed by the reference letter "P".

As illustrated in FIG. 1, the apparatus and method 20P is substantially the same as such methods and apparatus of U.S. Pat. No. 4,877,503 except that the electrode belt means 21P is formed from a plurality of conductive sections 150 that are electrically insulated from each other by suitable insulating means 151 so that the sections 150 are each adapted to move in a serial manner from the inlet means 105P to the outlet means 106P and cooperate with an adjacent portion of the lower electrode belt 22P to define its electrostatic field means 28P therewith for acting on its respective portion of the liquid bearing material 23P disposed therebetween whereby the intensity of such electrostatic field means 28P can be different than the intensity of an adjacent electrostatic field means 28P as the adjacent section 150 can have the voltage differential that is created between that section 150 and its adjacent portion of the lower electrode means 22P of a greater value than the voltage differential between the next left hand section 150 and its adjacent portion of the lower electrode 22P.

This can be accomplished by also forming the inner belt means 107P from a pluality of like conductive sections 152 being electrically insulated from each other by suitable insulating means 153 and imposing a charge thereon by a particular roller 111P having such charge imposed thereon by a charge means or wiper means 154 receiving its charge from a lead means 155 so that the particular section 152 transfers its charge value to the particular heads 122P of the particular projection means or units 112P disposed in electrical contact therewith and in electrical contact with its respective section 150 of the electrode belt 21P so that the respective section 150 is given such charge.

In this manner, a suitable computerized charging means (not shown) that is interconnected to the lead means 155 for the rollers 111P could be so programmed that the same will provide a certain voltage differential between the section 150' and the adjacent portion of the lower electrode means 22P of, say, 100 volts (even though the section 150 ' and the electrode belt 22P are disposed in electrical contact with the material 23P disposed therebetween for the reasons previously set forth) and then when that particular section 150 ' has moved to the right in FIG. 1 so as to be under the influence of the next adjacent upper roller means 111P'', the next roller means 111P'' will create a voltage differential with the lower electrode belt means 22P that is, say, 150 volts with each roller 111P thereafter from left to right in FIG. 1 increasing the voltage on that section 150 ' as the same moves further to the right so that by the time the section 150 ' reaches the outlet means 106P, the section 150 ' might create a voltage differential with the lower electrode means 22P of several hundred volts or even several thousand volts as the case may be. Similarly, the projections 38P of each section 150 likewise will have the voltage being created between the projection means 38P thereof and the electrode means 22P increased by the particular roller means 111P being effective to charge the same.

Thus, it is believed that by having the computer means sensing, with suitable sensors (not shown), the amount of dewatering that is taking place on each part of the material 23P as the same progresses from the inlet means 105P to the outlet means 106P, the computer means can control the amount of voltage gradient being applied thereto as the same progresses from the inlet means 105P to the outlet means 106P and thereby control the intensity of the electrostatic field means acting thereon as the particular section of the material 23P moves from the inlet means 105P to the outlet means 106P and such voltage gradient can be increased in uniform steps or varying steps as desired.

Likewise, while the upper rollers 111P and lower rollers 110P can be sonically and ultrasonically vibrated to impart vibration to the material 23P disposed therebetween for the reasons set forth in U.S. Pat. No. 4,877,503, the intensity of the vibrations can vary by having the sonic or ultrasonic energy being applied to the particular rollers 111P and/or 110P varied from the inlet means 105P to the outlet means 106P in the same manner that the wipers 154 are providing a different charge intensity to the various rollers 111P for the reasons previously set forth.

Figure 2:
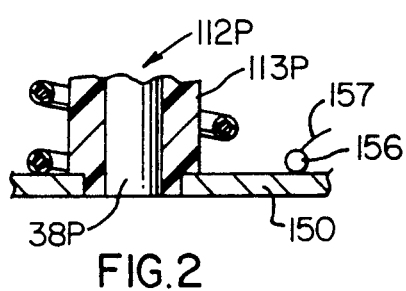
FIG. 2 is a larger view of a part of the structure of FIG. 1 and illustrates another apparatus and method of this invention.

Should the housings 113P of the units 112P each electrically insulate its particular projection means 38P from its respective section 150 of the electrode belt means 22P in the manner illustrated in FIG. 2, the section 150 thereof can be given a charge by a charging roller means 156 through its lead means 157 that will be different than the charge that will be given to the projection 38P thereof for all of the reasons set forth in U.S. Pat. No. 4,877,503 in having the projections electrically insulated from the electrode carrying the same so that a potential differential can be given between the projection 38P and its respective section 150 as illustrated in FIG. 2.

Figure 3:
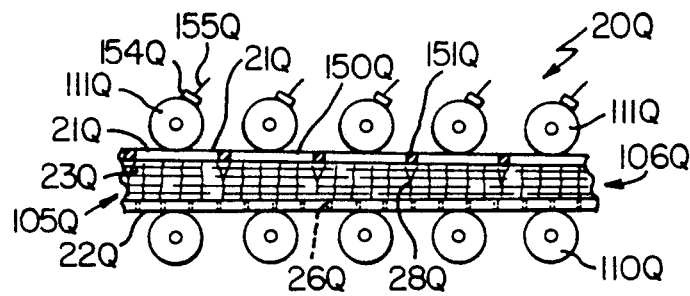
FIG. 3 is a view similar to FIG. 1 and illustrates another apparatus and method of this invention.

And while the sections 150 of the electrode means 21P have been illustrated as having at least one projection unit 112P carried thereby, it is to be understood that the electrode belt 21P could be provided without any of the projection units 112P so that the rollers 111P would directly engage against the sections 150 in the manner illustrated in FIG. 3 wherein another method and apparatus of this invention is generally indicated by the reference numeral 20Q and parts thereof similar to the method and apparatus 20P previously described are indicated by like reference numerals followed by the reference letter "Q".

As illustrated in FIG. 3, it can be seen that the upper electrode belt 21Q is formed of a plurality of sections 150Q electrically insulated from each other by the insulating means 151Q and respectively have the rollers 111Q disposed in electrical contact therewith so that the particular roller 111Q having the charge applied thereby by its wiper means 154Q through the lead means 155Q thereof will create a voltage differential between that respective section 150Q and the adjacent portion of the lower electrode belt means 22Q to have its electrostatic field 28Q act on the material 23Q disposed therebetween with a certain intensity that will be different than the intensity of the electrostatic field 28Q between another section 150Q for the reasons previously set forth in connection with the method and apparatus of FIG. 1.

Therefore, it can be seen that the apparatus and method 20P and 20Q of this invention each can vary the voltage between a particular section 150 or 150Q of its respective upper electrode belt 21P or 21Q and the lower belt means 22P or 22Q as that particular section 150 or 150Q moves from the inlet means to the outlet means of the apparatus and that varying voltage could be in steps of any desired magnitude of voltage charge or in substantially an infinitely variable manner such as by having the particular roller 111P infinitely increasing its charge from a starting value to an ending value to a particular section 150 from the time its leading edge 158 makes contact with the roller 111P to the time its trailing edge 159 is engaging that particular roller 111P with the roller 111P then dropping its charge back to its starting value when it is engaged by the leading edge 158 of the next section 150 being moved thereto.

Of course, it is to be understood that instead of increasing the voltage as a particular section 150 or 150Q moves from the inlet means to the outlet means, the same can actually have the voltage therein decreased or any combination of increasing or decreasing manner as the same could all be computer controlled with the computer itself applying the particular charge on the particular roller means 111P or 111Q as determined by many parameters being sensed by the computer or having been preprogrammed all in a manner well known in the computer art.

Also, it is believed that such computer means can be arranged to reduce the high charge value of each section 150 (or 150Q) as it leaves the outlet means 106P to a lower value that is sufficient for the charge value of the section 150 when it is returned to its beginning dewatering position at the inlet means 105P, the charge taken from such section 150 at the outlet means 106P being used by the computer means to add to the charge on the sections 150 intermediate the inlet means 105P and the outlet means 106P so that no charge is wasted by the method and apparatus of this invention. Thus, the charge being provided on each section 150 as it starts at the inlet means 105P can cause a voltage differential with the cooperating portion of the electrode means 22P of any desired starting voltage, such as 50 volts, and by the time that section 150 reaches the outlet means 106P the charge being provided thereon can cause a voltage differential with the cooperating portion of the electrode means 22P of any desired ending voltage, such as 1,000 volts, such indicated values being given merely for example purpose and not to be a limitation on this invention as each different type and degree of dryness of the liquid bearing material 23P being acted upon will have different voltage requirements, as desired.

Also, it is believed that as a section 150 or 150Q of the respective belt means 21P or 21Q moves from the inlet 105P or 105Q to the outlet 106P or 106Q of the respective apparatus 20P or 20Q, the initial charge thereon can be changed to an increasing charge, a decreasing charge, a pulsing charge, or an oscillating charge and then be again changed to any of such charges as desired so that by the time that particular section 150 or 150Q reaches the outlet 106P or 106Q the charge thereon could have been changed one or more times, such as first having a steady charge, then an oscillating charge for dielectrically heating the material adjacent thereto, then to a pulsing charge, then to a higher steady charge, etc. And all of this changing of the charge on that section 150 or 150Q could be computer controlled as previously set forth.

Thus, by merely grounding the lower belt means 22P or 22Q and changing the charge on the sections 150 and 150Q of the upper belt means 21P and 21Q, any desired combinations of electrostatic actions for acting on the material 23P or 23Q can be provided for the apparatus 20P and 20Q.

Further, it is believed that since an electrical current tends to flow through a path that has the least resistance between two members then it may be found that in an apparatus of the type where the upper electrode portion at the inlet means of the apparatus is electrically interconnected to the upper electrode portion at the outlet of the apparatus, such as provided by the belt means 21M of U.S. Pat. No. 4,877,503, more electrical current flows between the upper and lower electrode portions at the inlet means than at the outlet means because the resistance to the current flow through the liquid bearing material disposed therebetween increases as the liquid in such material is removed from the material as it moves from the inlet to the outlet. However, it is believed that by providing the section 150 and 150Q which are each electrically insulated from the other sections 150 and 150Q, the current flow through the material at each section 150 and 150Q as it moves from the inlet means to the outlet means of the apparatus can be accurately controlled or maintained by merely increasing or changing the voltage differential between that section 150 or 150Q and the lower electrode means 22P or 22Q in the manner previously set forth.

While the apparatus and methods 20P and 20Q each comprise endless belt means, it is to be understood that at least one of the belt means thereof could comprise the outer periphery of a roll or drum, such as the roll or drum of the aforementioned Candor U.S. Pat. No. 3,931,682, and have the individual conductive sections, similar to sections 150 and 150Q of the apparatus and methods 20P and 20Q, for the purpose previously set forth whereby the endless electrode means of this invention are not to be limited to just the belt means previously illustrated and described. For example, see FIGS. 4 and 5 wherein such structure is provided and will hereinafter be described.

Further, while the sections 150 and 150Q of the apparatus 20P and 20Q are illustrated as being in direct electrical contact with the material 23P and 23Q so that an electrical current can flow through the material 23P and 23Q, it is to be understood that the sections 150 and 150Q can be electrically insulated from the material 23P and 23Q, if desired, while the cooperating electrode means 22P and 22Q remains uninsulated and in electrical contact with the liquid bearing material 23P and 23Q or are also electrically insulated from the material 23P and 23Q, as desired.

Also, it is to be understood that the electrode means 21P and 22P, as well as the electrode means 21Q and 22Q, can be moved in the same direction but at different speeds, if desired.

While no means have been illustrated in the drawings of the apparatus 20P and 20Q for receiving the liquid that is forced through the openings 26P and 26Q in the lower belt means 22P and 22Q thereof, it is to be understood that suitable liquid collecting means can be provided within the confines of the lower looped belt means 22P and 22Q for collecting such liquid, such as is set forth in the aforementioned Maralidhara et al, U.S. Pat. No. 4,802,964, and such liquid collecting means can apply a suction to aid in such liquid removal as set forth in connection with the device 34 of FIG. 1 of U.S. Pat. No. 4,877,503.

While the various apparatus and methods of this invention have been previously described as stating that as the projection thereof, such as projection 38P, is moved closer toward the other electrode means, such as electrode 22P for the projection 38P, the voltage between such projection and such electrode can be increased to enhance the dewatering electroosmotic action as the intensity of the electrostatic field created thereby is increased, it is to be realized that as a particular projection, such as projection 38P, is moved toward its cooperating electrode means, such as electrode means 22P, and merely maintaining the same voltage between such projection and such electrode causes the electrostatic field created therebetween to intensify because the closer the projection comes to the cooperating electrode, the stronger the electrostatic field is therebetween even though the voltage differential remains steady therebetween.

Thus, when the main electrodes of each apparatus of this invention, such as electrodes 21P and 22P are respectively moved closer toward each other through the dewatering and/or compressing action previously set forth, the strength of the electrostatic field therebetween acting on the remaining liquid in the liquid bearing material disposed therebetween intensifies. Likewise, the projection of the projection of such upper electrode into such remaining liquid bearing material causes the field that it creates with the lower electrode to intensify the closer that projection gets to the lower electrode even if the voltage between that projection and that lower electrode remains the same. Therefore, increasing the voltage under either or both such circumstances further intensifies the created electrostatic field means for enhancing the dewatering action thereof.

While the liquid bearing material 23P or 23Q is being moved through the apparatus 20P or 20Q by the movement of the upper electrode 21P or 21Q and lower electrode 22P or 22Q, it is to be understood that the liquid bearing material 23P or 23Q can be moved by other means, such as belt means disposed between the electrode means with the electrode means either being movable therewith or being stationary as desired. Also, the liquid bearing material can be moved by a screw, such as in a screw press, while the outer cylindrical electrode means that is stationary could be in sections that are electrically insulated from each other so as to have the charges thereon different from the other sections thereof for the reasons previously set forth in connection with the apparatus 20P and 20Q, the screw having the screw thread thereof formed of electrically insulating material while the shaft thereof is formed of electrically conductive material and is grounded or oppositely charged from the sections of the cylindrical member.

Figure 4:
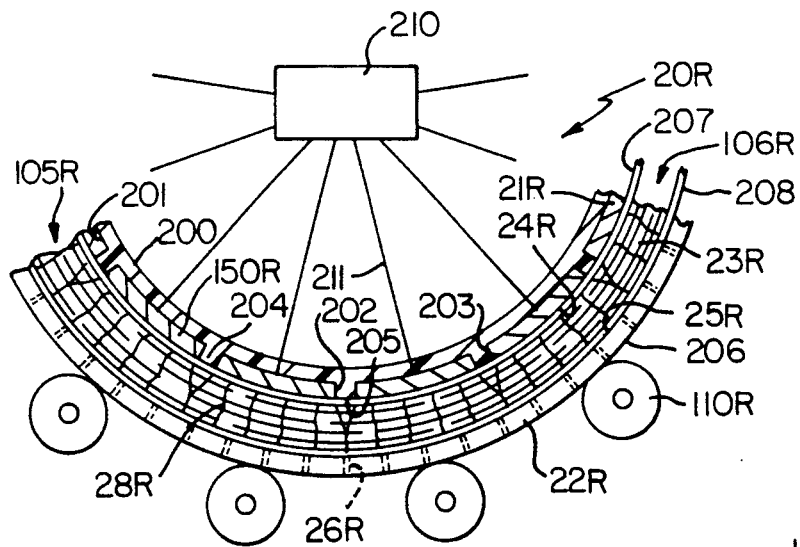
FIG. 4 is a view similar to FIG. 1 and illustrates another apparatus and method of this invention.

Another method and apparatus of this invention is generally indicated by the reference numeral 20R in FIG. 4 and parts thereof similar to the methods and apparatus 20P or 20Q previously described are indicated by like reference numerals followed by the reference letter "R", the apparatus 20P being similar to the apparatus set forth in the aforementioned European patent application No. 0,286,714.

As illustrated in FIG. 4, the apparatus 20R comprises a rotatable drum 200 formed of any suitable electrically insulating material, such as ceramic material, and carrying a first electrode means 21R on the outer periphery 201 thereof, the first electrode means 21R comprising a plurality of conductive arcuate sections or plates 150R that are fastened thereto in any suitable manner and are electrically insulated from each other by being spaced from each other at adjacent end edge means 202 and 203 thereof. In addition, electrical insulation means 204 are respectively disposed between the adjacent end edge means 202 and 203 of adjacent sections 150R and have outer peripheral means 205 that are arcuate and disposed substantially flush with the arcuate peripheral surface means 24R of the adjacent sections 150R as illustrated. However, it is to be understood that the insulation means 204 can project beyond the peripheral means 24R in the manner illustrated in FIG. 5 for a purpose hereinafter described.

The apparatus 20R comprises a second slectrode means 22R that is adapted to have its peripheral surface means 25R spaced outwardly in a generally concentric manner from the facing peripheral surface means 24R of the electrode means 21R by the liquid bearing material 23R that is fed into the inlet means 105R in any suitable manner, the electrode means 22R comprising a flexible endless belt means having suitable openings 26R therethrough for permitting the liquid of the liquid bearing material 23R to pass therethrough during the electrodewatering thereof caused by the electrostatic fields 28R in the manner previously described.

The apparatus 20R comprises a plurality of rollers 110R that engage the outer peripheral surface means 206 of the electrode means 22R to not only tend to compress the electrode means 22R toward the electrode means 21R to compress the liquid bearing material 23R therebetween, but to also vibrate the electrode means 22R and, thus, the material 23R for the reasons previously set forth by having the rollers 110 vibrated sonically or ultrasonically as previously set forth.

If desired, porous belts 207 and 208 of any suitable nonconductive material can be disposed respectively against the peripheral surface means 24R and 25R of the electrode means 21R and 22R so as to confine the liquid bearing material 23R therebetween while still effectively having the liquid bearing material 23R disposed in electrical contact with the electrode means 21R and 22R, the belts 207 and 208 respectively moving in unison with the electrode means 21R and 22R from the inlet means 105R to the outlet means 106R of the apparatus 20R.

A computer controlled means 210 is electrically connected to each section 150R by suitable lead means 211 so that the computer controlled means 210 can vary the voltage differential between a particular section 150R and its cooperating part of the grounded electrode means 22R as that particular section 150R moves from the inlet means 105R to the outlet means 106R for the same purpose as the sections 150 and 150Q of the apparatus 20P and 20Q.

Thus, it can be seen that the resulting electrostatic fields 28R of the apparatus 20R can have the intensities thereof changed as each field 28R moves from the inlet means 105R to the outlet means 106R with its respective section of the liquid bearing material 23R.

While the apparatus 20R illustrated in FIG. 4 does not have projection means carried by the sections 150R thereof as in the apparatus 20P, it is to be understood that the apparatus 20R could have such projection means, if desired.

Figure 5:
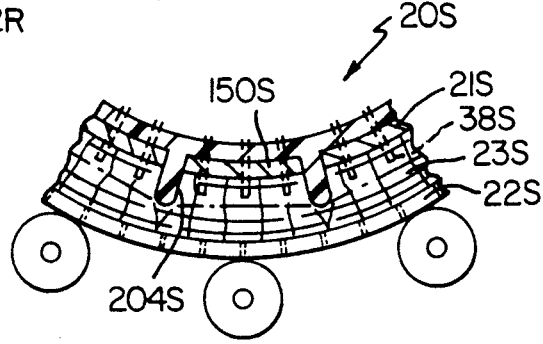
FIG. 5 is a view similar to FIG. 4 and illustrates another apparatus and method of this invention.

For example, see the method and apparatus 20S illustrated in FIG. 5 wherein the parts thereof that are similar to the parts of the apparatus 20P, 20Q and 20R previously described are indicated by like reference numerals followed by the reference letter "S".

As illustrated in FIG. 5, the apparatus 20S does not have the belt means 207 of the apparatus 20R and each section 150S of the apparatus 20S has at least one projection 38S that is movable relative thereto and is adapted to be projected into the material 23S disposed between the electrode means 21S and 22S for the reasons previously set forth. In order to prevent the projections 38S from reaching the electrode means 22S, the insulation 204S between the adjacent sections 150S can project beyond the sections 150S so as to contact the electrode means 22S before the adjacent projections 38S can reach the same. Of course, the belt means 208 of the apparatus 20R could be used with the apparatus 20S, if desired.

Therefore, it can be seen that in the operation of the apparatus 20P, 20Q, 20R and 20S, the charge being maintained on each section 150, 150Q, 150R and 150S thereof even though a current flow is being provided through the adjacent section of the liquid bearing material 23P, 23Q, 23R and 23S between such section 150, 150Q, 150R and 150S and the cooperating part of the electrode means 22P, 22Q, 22R and 22S to cause liquid to leave the material 23P, 23Q, 23R and 23S by electroosmosis, can be changed as that section 150, 150Q, 150R and 150S moves from the inlet means to the outlet means of the apparatus and such electrostatic field action can be augmented or enhanced by vibratory action and/or the projections 38P and 38S for the reasons previously set forth. And such changing of the charge on each section 150, 150Q, 150R and 150S can result in an increasing voltage, a decreasing voltage, a pulsed voltage, an oscillated voltage or any combination thereof, as desired.

It is to be understood that while each embodiment of this invention as represented respectively by the reference numerals 20P, 20Q, 20R and 20S has been illustrated and described as having certain structure and operating in a certain manner, each embodiment of this invention can be modified by including or substituting one or more structural and/or operational features of any one or more of the other embodiments of this invention even though such modification has not been actually described.

In addition, it can be seen that the terms "electrostatic field" and "electric field" as used in this application are synonomous and are intended to describe a uniform or nonuniform field that is steady, varying, unidirectional pulsed or oscillated and that is created through the liquid bearing material disposed between two members that have a potential differential imposed thereon in a manner to be a steady voltage, a varying voltage, a unidirection pulsed voltage or an oscillating voltage whether those members are in electrical contact with the liquid bearing material or electrically insulated therefrom. Thus, it is believed that a higher voltage between such members must be utilized to remove liquid from the liquid bearing material when no electrical current is flowing between such members and through the liquid bearing material. However, it is realized that different liquid bearing materials have different conductivities and that some liquid bearing materials have substantially no conductivity whereby the voltage utilized for dewatering a particular liquid bearing material will be different than the voltage utilized for dewatering another type of liquid bearing material and that the voltage utilized will be different if the members are electrically insulated from a particular liquid bearing material than the voltage utilized if the members are in electrical contact with that particular liquid bearing material.

It is also to be understood that while the terms "dewater", etc., have been previously used throughout this description, it is intended that the "liquid" of the liquid bearing material to be removed by the various apparatus and methods of this invention can be any suitable aqueous or nonaqueous liquid or even mixtures thereof, if desired. For example, see the various types of liquid bearing material that can be utilized in the apparatus and methods of this invention and are set forth in its various references that have been previously incorporated by reference into the disclosure.

Therefore, it can be seen that this invention not only provides a new apparatus for removing liquid from liquid bearing material and the like but also this invention provides a new method for removing liquid from liquid bearing material or the like.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an apparatus for removing liquid from liquid bearing material and comprising a first electrode means and a second electrode means, said first and second electrode means having portions thereof disposed adjacent each other and defining an inlet means to said adjacent portions and an outlet means from said adjacent portions, said apparatus comprising a rotatable drum means having an outer peripheral surface means, said outer peripheral surface means comprising said first electrode means, said second electrode means comprising a movable endless belt means having said adjacent portion thereof spaced from said adjacent portion of said outer peripheral surface means in a generally concentric manner therewith, means for feeding said liquid bearing material into said inlet means, means for moving said liquid bearing material from said inlet means to said outlet means so that sections of said material serially move from said inlet means to said outlet means while being disposed between said adjacent portions, and means for creating a voltage between said first and second electrode means so as to create an electrostatic field arrangement between said adjacent portions of said first and second electrode means for acting through said material that is disposed theebetween to remove liquid from that said material, the improvement wherein said apparatus has means for providing different voltages between different parts of said first and second electrode means so that different intensities of the electrostatic field arrangement serially act through each said section of said material as each said section of material moves from said inlet means to said outlet means.

2. An apparatus as set forth in claim 1 wherein said means for providing said different voltages causes the intensities of the electrostatic field arrangement that serially act through each said section of said material to increase as each said section of material moves from said inlet means to said outlet means.

3. An apparatus as set forth in claim 1 wherein said means for providing said different voltages causes the intensities of the electrostatic field arrangement that serially act through each said section of said material to decrease as each said section of material moves from said inlet means to said outlet means.

4. An apparatus as set forth in claim 1 wherein each section of said material is adapted to be in electrical contact with said adjacent portions of said first and second electrode means as that said section moves from said inlet means to said outlet means.

5. An apparatus as set forth in claim 1 and comprising means for vibrating said liquid bearing material between said adjacent portions of said first and second electrode means at least some of the time that said material is moving from said inlet means to said outlet means.

6. An apparatus as set forth in claim 1 and comprising means for moving said first and second electrode means so that said adjacent portions thereof serially move in the same direction thereof from said inlet means to said outlet means whereby said sections of said material serially move with said adjacent portions from said inlet means to said outlet means while being disposed between said adjacent portions, said means for providing said different voltages comprising means for changing the voltage between said parts of said first and second electrode means so that the intensity of the electrostatic field arrangement that acts through each said section of said material changes as each said section of material moves from said inlet means to said outlet means.

7. An apparatus as set forth in claim 6 wherein said first electrode means has a plurality of sections disposed in a serial manner about said outer peripheral surface means of said drum means and being electrically insulated from each other whereby each section of said first electrode means is adapted to be moved from said inlet means to said outlet means when that section is defining part of said portion of said first electrode means, said means for changing said voltage being operatively interconnected to each said section of said first electrode means during at least some of the time that said section moves from said inlet means to said outlet means so that the voltage between that section and the adjacent portion of said second electrode means is changed.

8. An apparatus as set forth in claim 7 wherein said means for changing said voltage increases the voltage between each section of said first electrode means and the adjacent portion of said second electrode means a plurality of times as that section moves from said inlet means to said outlet means.

9. An apparatus as set forth in claim 7 wherein said means for changing said voltage changes the voltage between each section of said first electrode means and the adjacent portion of said second electrode means in substantially an infinitely varying manner.

10. An apparatus as set forth in claim 7 wherein said means for changing said voltage changes the voltage between each section of said first electrode means and the adjacent portion of said second electrode means in a stepped manner.

11. An apparatus as set forth in claim 7 wherein each section of said first electrode means is adapted to be in electrical contact with said material as that said section moves from said inlet means to said outlet means.

12. An apparatus as set forth in claim 1 and comprising means for vibrating said liquid bearing material between said adjacent portions of said first and second electrode means at least some of the time that said material is moving from said inlet means to said outlet means.

13. An apparatus as set forth in claim 7 wherein each section of said first electrode means has at least one projection extending therefrom so as to be disposed in said material between that said section and the adjacent portion of said second electrode means to assist in removing liquid from said liquid bearing material.

14. An apparatus as set forth in claim 13 and comprising means for projecting the projection of each section of said first electrode means to different positions thereof relative to said material between that said section and the adjacent portion of said second electrode means and relative to that said section at least some of the time that said section moves between said inlet means and said outlet means.

15. An apparatus as set forth in claim 7 wherein each said section of said first electrode means has opposed side edge means disposed transverse to the axis of rotation of said drum means and being spaced from adjacent side edge means of adjacent sections of said first electrode means, said drum means comprising electrical insulating means disposed between said adjacent edges of said sections of said first electrode means.

16. An apparatus as set forth in claim 15 wherein each said section of said first electrode means has an arcuate surface between said side edge means thereof and facing outwardly from the axis of rotation of said drum means.

17. An apparatus as set forth in claim 16 wherein said electrical insulating means between each pair of said adjacent side edge means of said sections of said first electrode means has outer surface means that is disposed substantially flush with said arcuate surfaces of the two sections of said first electrode means that have that said pair of said adjacent side edge means.

18. An apparatus as set forth in claim 16 wherein said electrical insulating means between each pair of said adjacent side edge means of said sections of said first electrode means has outer surface means that projects substantially radially outwardly from said drum means beyond said arcuate surfaces of the two sections of said first electrode means that have that said pair of said adjacent side edge means.

19. In a method for removing liquid from liquid bearing material and comprising the steps of providing a first electrode means and a second electrode means having portions thereof disposed adjacent each other and defining an inlet means to said adjacent portions and an outlet means from said adjacent portions with said first electrode means comprising an outer peripheral surface means of a rotatable drum means and with said second electrode means comprising a movable endless belt means having said adjacent portion thereof spaced from said adjacent portion of said outer peripheral surface means in a generally concentric manner therewith, feeding said liquid bearing material into said inlet means, moving said liquid bearing material from said inlet means to said outlet means so that sections of said material serially move from said inlet means to said outlet means while being disposed between said adjacent portions, and creating a voltage between said first and second electrode means so as to create an electrostatic field arrangement between said adjacent portions of said first and second electrode means for acting through said material that is disposed therebetween to remove liquid from said material, the improvement comprising the step of providing different voltages between different parts of said first and second electrode means so that different intensities of the electrostatic field arrangement serially act through each said section of said material as each said section of material moves from said inlet means to said outlet means.

* * * * *